United States Patent Office 3,652,738
Patented Mar. 28, 1972

3,652,738
ISOPHORONE PHOSPHONATES
Abdul-Munim Nashu, Hamden, Henri Ulrich, Northford, and Adnan A. R. Sayigh, North Haven, Conn., assignors to The Upjohn Company, Kalamazoo, Mich.
No Drawing. Filed Oct. 1, 1969, Ser. No. 862,972
Int. Cl. C07f 9/40
U.S. Cl. 260—946          2 Claims

ABSTRACT OF THE DISCLOSURE

Compounds are disclosed having the formula:

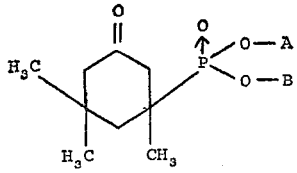

wherein A and B are members selected from the group consisting of lower hydroxyalkyl, hydroxyaryl of 6 to 12 carbon atoms and a moiety of formula

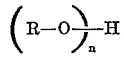

wherein R is lower-alkylene of 2 to 12 carbon atoms having 2 carbon atoms separating the valencies, and $n$ is an integer of 2 to 20. These compounds are useful as flame retarding components of polymer systems such as polyurethane and polyamide foam systems.

BACKGROUND OF THE INVENTION

(1) Field of the invention

This invention relates to novel cyclohexane phosphonates and is more particularly concerned with novel hydroxy-substituted esters of trimethyl cyclohexan-3-phosphonic acid and with methods for their preparation and with their use as fire retarding components of polyurethane, polyamide and like polymers.

SUMMARY OF THE INVENTION

The invention is of compounds of the formula:

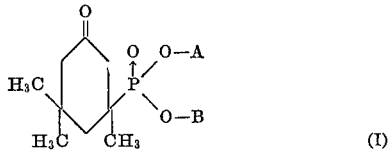

wherein A and B are members selected from the group consisting of lower hydroxyalkyl, hydroxyaryl and a moiety of formula

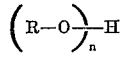

wherein R is lower-alkylene of 2 to 12 carbon atoms having 2 carbon atoms separating the valencies, and $n$ is an integer of 2 to 20. Examples of R include ethylene, 1,2-propylene, 2,3-hexylene, 4,5-dodecylene and the like.

The term "lower-hydroxyalkyl" means alkyl of from 2 to 8 carbon atoms, in which alkyl group one hydrogen atom is replaced by hydroxyl. Illustrative of lower-hydroxyalkyl are 2-hydroxyethyl, 3-hydroxypropyl, 2-hydroxypropyl, 3-hydroxy-2-ethylbutyl, 4-hydroxypentyl, 2-hydroxyoctyl, and the like.

The term "hydroxyaryl" means the aromatic hydrocarbon moiety obtained by removing a nuclear hydrogen atom from an aromatic hydroxyhydrocarbon having 6 to 12 carbon atoms. Illustrative of hydroxyaryl are hydroxyphenyl, hydroxytolyl, hydroxylyl, hydroxynapthyl, and the like.

The compounds of the invention of Formula I are useful as flame retardant components of polymer systems, such as polyurethane and polyamide foam systems. For example, the compounds I are polyols, and can be added to formulations for polyamide foams, being incorporated into the polymer structure and lending fire retardancy to said foams. By virtue of their free hydroxy groups, compounds of the Formula I will react with polyisocyanates. Accordingly said compounds can be employed as a part of, or as the whole of, the polyol component employed in preparing polyurethane foams by conventional procedures and thereby said compounds become chemically incorporated in those polymer molecules. The value of phosphorus compounds incorporated within polymer structures as flame retardants is well-known and described, for example in "Polyurethanes: Chemistry and Technology, Part II," Saunders and Frisch, Interscience Publishers, New York, N.Y., 1964, pp. 222–225.

DETAILED DESCRIPTION OF THE INVENTION

Compounds of the invention of Formula I are conveniently prepared using methods well-known in the art, from 3,5,5-trimethyl cyclohexan-1-on-3-yl phosphonic acid, which for convenience will hereinafter be referred to as "isophorone phosphonic acid." Isophorone phosphonic acid is readily prepared, for example, by hydrolysis of O,O'-diethyl isophoronephosphonate (O,O'-diethyl 3,5,5-trimethylcyclohexan - 1 - on - 3 - ylphosphonate), using conventional methods of hydrolysis. Diethyl isophoronephosphonate is a well-known compound readily prepared by the method of A. N. Pudovik et al., Zhur. Obsh. Khim. 27, pp. 1617–21, (1957).

To prepare compounds of the Formula I wherein A is a moiety of formula

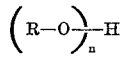

as before defined and B is hydroxyalkyl or a moiety

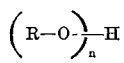

the isophorone phosphonic acid is reacted with an appropriate amount of the corresponding alkylene oxide in the presence of an inert organic solvent, i.e. a solvent which does not enter into or interfere in any way with the principal reaction taking place. Examples of such solvents are chlorobenzene, chloroform, carbon tetrachloride, tetrahydrofuran and the like.

The alkylene oxides which can be employed are those which are for the most part well-known, and readily prepared using methods well-known in the art. Examples of such alkylene oxides include ethylene oxide, propylene oxide, 1,2-butylene oxide, and the like.

The reaction between the isophorone phosphonic acid and the alkylene oxide can be carried out over a wide range of temperatures, advantageously from about 25° C. to the boiling point of whatever solvent system is employed in the reaction, preferably from about 40° C. to about 100° C. Generally speaking the reaction proceeds readily, in step-wise fashion as schematically illustrated by the following formulae using propylene oxide as the alkylene oxide for illustrative purposes:

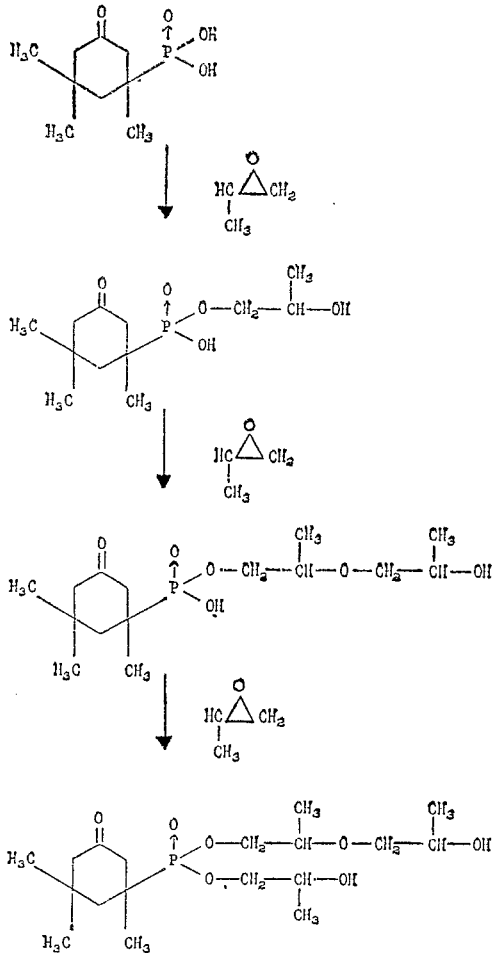

As illustrated, the initial reaction entails multiple addition of alkylene oxide to one of the hydroxy groups attached to phosphorus to form a single chain of polyoxyalkylene structure. The addition is catalyzed by the presence of the remaining hydroxy group attached directly to the phosphorus. As the chain length of the polyoxyalkylene group carries the terminal hydroxy group thereon outside the catalytic influence of the remaining P—OH group, the further addition of alkylene oxide will occur at the latter hydroxy group thereby neutralizing its catalytic role in further addition reactions. At this point, there is formed a compound of Formula I wherein A is lower-hydroxyalkyl and B is

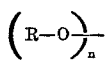

wherein R and $n$ are as before defined. The hydroxy ester so obtained will be a mixture of isomers having both primary and secondary hydroxy groups.

Further alkylene oxide can then be added to the compound (I) so obtained but reaction continues at a slower rate and it is preferable to employ a catalyst in such instances. Examples of suitable catalysts are tertiary amines such as triethylamine, tripropylamine, triethylenediamine, N,N,N',N'-tetramethyl-1,3-butanediamine, N,N-dimethylaniline and the like, alkali metals such as sodium, potassium and the like, alkali metal hydroxides such as sodium hydroxide, potassium hydroxide, and the like, and alkali metal alkoxides such as sodium methoxide, potassium ethoxide, potassium tert-butoxide and the like. The esters produced under alkaline catalytic conditions have predominantly secondary terminal hydroxy groups.

One skilled in the art will immediately recognize that the structure of A and B in compounds of the Formula I can be varied and controlled by controlling the proportions of reactants, and also by variation of alkylene oxide reactant. For example, if desired, two or more alkylene oxides can be employed either simultaneously or sequentially in the preparation of compound (I). Where a mixture of alkylene oxides is employed in the reaction with the isophorone phosphonic acid the resulting mixture will be of compounds of the Formula I wherein radicals A and B are different. By reacting one equivalent proportion of isophorone phosphonic acid with one equivalent proportion of an alkylene oxide and then reacting the product so obtained with a second alkylene oxide or a mixture of two or more alkylene oxides, it is possible to obtain compounds of the Formula I wherein the alkylene residues in one of the esterifying radicals differ from those in the other. Similarly by reacting one equivalent of isophorone phosphonic acid with two or more equivalent of a first alkylene oxide and then reacting the resulting product with a second alkylene oxide or a mixture of two or more alkylene oxides it is possible to obtain compounds of Formula I in which the esterifying radicals each contain two or more different alkylene residues.

An alternative procedure for preparing compounds of the Formula I wherein A and B are each selected from lower-hydroxyalkyl of at least 4 carbon atoms, or the radical moiety

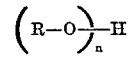

wherein R is as before defined but having at least 4 carbon atoms, $n$ is 2 and the preferred procedure when A and B are hydroxyaryl is by esterification of the phosphonic acid or by transesterification of a dialkyl ester of isophorone phosphonic acid. The ester is transesterified using conventional techniques by reaction with a glycol of formulae:

$$HO—(CH_2)_m—OH \quad (II)$$
$$HO—(CH_2)_m—O—(CH_2)_m—OH \quad (III)$$
$$HO—X—OH \quad (IV)$$

and mixtures thereof, wherein $m$ is an integer of from 4 to 12, and X is arylene such as phenylene, tolylene, xylylene, naphthylene and the like. The only other requirement for the glycol is that the particular glycol employed have a higher boiling point than the alcohol by-product of the reaction. To illustrate the reaction the following schematically represents the reaction when the ester used is O,O'-diethyl isophorone phosphonate (Prepared by the method of Pudovik et al. supra) and the glycol used is of Formula II:

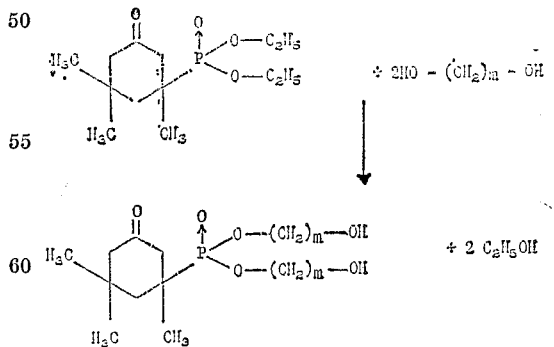

wherein $m$ has the significance hereinbefore assigned to it.

Illustrative glycols of Formula II include, for example 1,4-butanediol, 1,6-hexanediol, 2-propyl 1,5-pentanediol, and 3-methyl 1,8-octanediol. Illustrative glycols of Formula III include, for example dipropylene glycol, dibutylene glyol, dipentylene glycol, among like other, and mixtures thereof. The use of aromatic glycols of Formula IV, such as hydroquinone, 1,4-dihydroxynaphthalene, and the like yields compounds of Formula I wherein A and B are hydroxyaryl as before defined. For the most part, the above described glycols are well-known as is their preparation. Any combination of glycols of the above formulae may be used, to obtain mixtures of compounds of Formula I.

The transesterification is carried out by procedures well-known in the art, for example, by heating approximately stoichiometric quantities of the dialkylester and the glycol, if desired in the presence of an inert solvent such as chlorobenzene, o-dichlorobenzene, 1,2,4-trichlorobenzene, toluene, xylene, Tetralin, and the like, and removing the monohydric alcohol as it is formed. Catalytic amounts of metallic sodium assist in the reaction.

When the molar proportions of reactants are 2 to 1 (glycol to ester), the principal product, a compound of the Formula I, occurs wherein A and B are the same, and corresponds to the structure of the glycol employed since it is the oxygen-phosphorus bond which breaks and reforms with the new oxygen donated by the glycol.

It will be apparent to one skilled in the art that any combination of the above methods of preparation of compounds of the Formula I can be employed to vary considerably the structure of A and B, which need not be the same, and that appropriate selection of alkylene oxide reactants, mixtures thereof, glycols and mixtures thereof, will also result in considerable variations of compounds of the Formula I.

The following preparations and examples describe the manner and process of making and using the invention and set forth the best mode contemplated by the inventors of carrying out the invention, but are not to be construed as limiting.

PREPARATION 1

Five hundred and thirty gms. of O,O'-diethyl 3,5,5-trimethylcyclohexan-1-on-3-yl phosphonate (Pudovik et al. supra), 300 ml. concentrated hydrochloric acid and 300 ml. water are mixed in a suitable vessel equipped with a fractionating column. The mixture is heated to reflux temperature for 30 to 35 hours during which time hydrogen chloride is added at a rate of 200–300 cc. per minute. At the end of the above time, ethanol, water and hydrogen chloride are removed under reduced pressure leaving a semi-solid residue. The residue is boiled with 500 ml. methyl ethyl ketone, cooled, filtered and the insoluble material is washed twice with 150 ml. methyl ethyl ketone to yield 355 gms. (84.5 percent theory) of 3,5,5-trimethyl-cyclohexan-1-on-3-yl phosphonic acid having a melting point of 160° C. to 170° C. Recrystallization twice from methyl ethyl ketone raised the melting point to 170° C. to 172° C.

EXAMPLE 1

A solution of 44 gms. (0.2 mole) of 3,5,5-trimethyl-cyclohexan - 1 - on-3-yl phosphonic acid (as obtained in Preparation 1 above) in 200 ml. tetrahydrofuran is heated to 40° C. To this solution is added dropwise 80 ml. propylene oxide over a period of about ½ hour. The mixture is heated at circa 55° C. in suitable reflux appaartus for about 6 hours, following which excess propylene oxide and solvent are removed under reduced pressure using temperatures of between 55° C. to 100° C. The residue consists of 79 gms. of a viscous yellow fluid with hydroxyl equivalent weight of 102 and acid number 0.

Infra-red spectral analysis indicates the residue to be O-2-hydroxypropyl O'-2-(2-hydroxypropyloxy)propyl 3,5,5-trimethyl-cyclohexan-1-on-3-yl-phosphonate.

EXAMPLE 2

In a suitable apparatus, a mixture of 0.2 mole O,O'-diethyl 3,5,5 - trimethyl-1-cyclohexan-1-on-3-ylphosphonate, obtained by the method of Pudovik et al. supra, and 0.6 mole of diethylene glycol and 0.5 g. of sodium metal is heated above 150° C. and the generated ethanol is removed by distillation. The end of the reaction is indicated by cessation of ethanol formation. Unreacted glycol and residual ethanol are removed under reduced pressure and heating at circa 90° C. leaving a residue of O,O'-bis(2-hydroxyethylethoxy) - 3,5,5 - trimethylcyclohexan-1-on-3-ylphosphonate.

Repeating the procedure of this example, but substituting for diethylene glycol the following glycols 1,4-butanediol, 1,6-hexandiol, dipropylene glycol, and hydroquinone there are obtained:

O,O'-bis(4-hydroxybutyl)-3,5,5-trimethylcyclohexan-1-on-3-ylphosphonate;

O,O'-bis(6-hydroxyhexyl) - 3,5,5 - trimethylcyclohexan-1-on-3-ylphosphonate,

O,O'-bis(2-hydroxypropylmethylethoxy) - 3,5,5 - trimethylcyclohexan-1-on-3-ylphosphonate, and O,O'-bis(4-hydroxyphenyl)-3,5,5 - trimethylcyclohexan-1-on-3-ylphosphonate, respectively.

What is claimed is:
1. A compound of the formula:

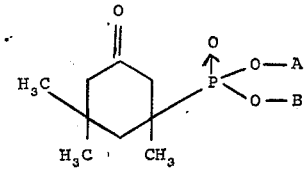

wherein A and B are members selected from the group consisting of lower hydroxyalkyl, hydroxyaryl of 6 to 12 carbon atoms, inclusive and a moiety of formula (R—O)$_n$H wherein R is lower alkylene of 2 to 12 carbon atoms having 2 carbon atoms separating the valencies, and $n$ is an integer of 2 to 20.

2. The compound according to claim 1 which is O-2-hydroxypropyl O' - 2-(2-hydroxypropyloxy)propyl 3,5,5-trimethyl-cyclohexan-1-on-3-yl-phosphonate.

References Cited

Pudovik et al., Zhur. Obsh. Khim., 27 (1957) pages 1617–1621.

JOSEPH REBOLD, Primary Examiner

R. L. RAYMOND, Assistant Examiner

U.S. Cl. X.R.

260—77.5 AR, DIG. 24